United States Patent
Chang

(10) Patent No.: US 7,053,977 B2
(45) Date of Patent: May 30, 2006

(54) LASER REPAIR STRUCTURE OF LIQUID CRYSTAL DISPLAY DEVICE AND METHOD THEREOF

(75) Inventor: Shu-Hsiang Chang, Taipei (TW)

(73) Assignee: Toppoly Optoelectronics Corp., Chu-Nan (TW)

( * ) Notice: Subject to any disclaimer, the term of this patent is extended or adjusted under 35 U.S.C. 154(b) by 30 days.

(21) Appl. No.: 10/861,356

(22) Filed: Jun. 7, 2004

(65) Prior Publication Data
US 2004/0246395 A1 Dec. 9, 2004

(30) Foreign Application Priority Data
Jun. 6, 2003 (TW) ............................... 92115338 A

(51) Int. Cl.
*G02F 1/13* (2006.01)
(52) U.S. Cl. ...................................................... 349/192
(58) Field of Classification Search ................. 349/192
See application file for complete search history.

(56) References Cited

U.S. PATENT DOCUMENTS

| | | | |
|---|---|---|---|
| 5,943,106 A * | 8/1999 | Sukenori et al. .............. 349/39 |
| 6,642,973 B1 * | 11/2003 | Cheng et al. .................. 349/55 |
| 6,664,568 B1 * | 12/2003 | Lai .............................. 257/59 |
| 6,680,770 B1 * | 1/2004 | Nagase ........................ 349/139 |
| 6,856,374 B1 * | 2/2005 | Ozaki et al. ................. 349/192 |
| 2002/0054248 A1 * | 5/2002 | Cheng et al. .................. 349/54 |

* cited by examiner

Primary Examiner—James A. Dudek
(74) Attorney, Agent, or Firm—Liu & Liu

(57) ABSTRACT

A laser repair structure of a LCD device obtained by extending dummy metal patterns of the LCD device is used to solve an abnormal color display. The structure includes a first electrical repair layer extending form a dummy metal to a first laser repair location; a second electrical repair layer extending form the dummy metal to a second laser repair location; a third electrical repair layer extending form a first source/drain electrode to the first laser repair location, a first dielectric layer provided between the third electrical repair layer and the first electrical repair layer; and a fourth electrical repair layer extending form a second source/drain electrode to the second laser repair location, the dielectric layer being also provided between the fourth electrical repair layer and the second electrical repair layer. The electrical repair layer is connected electrically with the third electrical repair layer after a first laser beam is irradiated to the first laser repair location, and the second electrical repair layer is connected electrically with the fourth electrical repair layer after a second laser beam is irradiated to the second laser repair location.

21 Claims, 5 Drawing Sheets

LASER REPAIR STRUCTURE OF LIQUID CRYSTAL DISPLAY DEVICE AND METHOD THEREOF

BACKGROUND OF THE INVENTION

1. Field of the Invention

The invention relates to a laser repair structure of liquid crystal display (LCD) device and method thereof, more particularly to a laser repair structure of LCD device and method thereof by extending the original dummy metal patterns of the LCD device.

2. Description of the Prior Art

Display devices have become a common device in daily life. Televisions or computers all have incorporated display devices for displaying images to the user. The conventional cathode-ray tube (CRT) takes up a lot of space. In certain applications, such as notebook computers, CRT simply cannot be used. Hence, a dot matrix flat display product, such as TFT LCD (thin film transistor liquid crystal display), has been successfully promoted.

The TFT LCD is not a self-illuminating display. Liquid crystal is a substance that has the characteristics of both solid and liquid, whereby the arrangement of liquid crystal will be changed subject to the impetus of external electric field. The TFT, corresponding to one pixel, can apply the controlled electric field to liquid crystal for the purpose of switching orientation of liquid crystal.

However, some unexpected particles will be deposited in the TFT under the manufacturing procedures, especially for the fabrication of the TFT. Such particles may result in abnormal short or open circuits, and the pixel corresponding to such defective TFT cannot be switched ON/OFF normally. This phenomenon is considered a defect.

When the defect occurs and only little defective pixels are found, a laser repair method will be executed generally. A cross-sectional view of a partial structure of a TFT LCD and the traditional laser repair method are illustrated in FIG. 1. The TFT LCD has a transparent substrate 100, which is a glass substrate generally. There are some TFTs formed on the transparent substrate 100, and each TFT 102 has a corresponding address. Sealant 106 is put around the edges of the transparent substrate 100 and an opening is left before an injection of liquid crystal. A second substrate with a color filter 104 is attached to the sealant 106, and the liquid crystal layer 108 is injected into the space formed by the second substrate 104, the transparent substrate 100 and the sealant 106 through the opening. At last, the opening is sealed by the sealant again, and then the semi-finished TFT display device is produced accordingly.

Before executing the next procedure, the switching between bright and dark of each pixel will be checked first. When an abnormal short/open circuit occurred at a defective TFT, the laser repair method will be used. Conventionally, a laser source 110 produces a high-energy laser beam 112, focusing on the defective TFT, so as to cut a metal line of the TFT or destroy the TFT.

Since the mechanism of the above laser repair method is to destroy the TFT, the defective pixel corresponding such TFT will become the permanent dark dot. In other words, such pixel cannot display its color (red, blue and green) under the normal condition, and the color of such dot including the defective pixel is obviously abnormal in comparison to other normal display dots. The user will be aware of its presence easily.

SUMMARY OF THE INVENTION

In light of the state of the art described above, it is an object of the present invention to provide a laser repair structure of a liquid crystal display (LCD) device and method thereof that can reduces the problems of the conventional laser repair method for LCD device described above.

It is another object of this invention to provide a laser repair structure of a liquid crystal display (LCD) device and method thereof for fixing one defect, which only uses the laser beams twice by extending the patterns of the original dummy metal.

A further object of this invention is to provide a laser repair structure of liquid crystal display (LCD) device and method thereof so as to increase the yield and reduce the energy of the laser beam by using a thinner irradiated dielectric layer.

In view of the above and other objects which will become apparent as the description proceeds, there is provided according to a general aspect of the present invention a laser repair method for manufacturing a liquid crystal display device, which comprises a first electrical repair layer extending from a dummy metal to a first laser repair location; a second electrical repair layer extending from the dummy metal to a second laser repair location; a third electrical repair layer extending from a first source/drain electrode to the first laser repair location; a fourth electrical repair layer extending from a second source/drain electrode to the second laser repair location; and a dielectric layer provided between the third electrical repair layer and the first electrical repair layer, and being also provided between the fourth electrical repair layer and the second electrical repair layer. The method is described below. A first laser beam is irradiated to the first laser repair location for connecting electrically the first electrical repair layer and the third electrical repair layer, and a second laser beam is irradiated to the second laser repair location for connecting electrically the second electrical repair layer and the fourth electrical repair layer.

Based on the idea described above, the dummy metal is located on a substrate of a transmissive LCD such that it can prevent from light leakage between two adjacent pixel areas.

Based on the aforementioned idea, the dummy metal is located on a substrate of a reflective LCD such that it can planarize said dielectric layer.

Based on the idea described above, the material of the dummy metal is selected one from the group consisting of Al, Cu and both.

Based on the idea described above, the thickness of the dielectric layer is about 0.6 micron.

Based on the idea described above, the fourth electrical repair layer leaps across a scan line.

Based on the aforementioned idea, the width of the fourth electrical repair layer above the scan line is smaller than that of the other parts of the fourth electrical repair layer.

Based on the idea described above, the material of the first and second electrical repair layers of the dummy metal is selected one from the group consisting of Al, Cu and both.

Based on the aforementioned idea, the material of the third electrical repair layer and the fourth electrical repair layer is selected one from the group consisting of Al, Cu and both.

Based on the idea described above, the material of the third electrical repair layer and the fourth electrical repair layer is polysilicon.

In view of the above and other objects which will become apparent as the description proceeds, there is provided according to a general aspect of the present invention a laser repair structure for liquid crystal display device. The laser repair structure comprises a first electrical repair layer extending from a dummy metal to a first laser repair location; a second electrical repair layer extending from the dummy metal to a second laser repair location; a third electrical repair layer extending from a first source/drain electrode to the first laser repair location; a fourth electrical repair layer extending from a second source/drain electrode to the second laser repair location; and a dielectric layer provided between the third electrical repair layer and the first electrical repair layer; and being also provided between the fourth electrical repair layer and the second electrical repair layer.

Based on the idea described above, the dummy metal is located on a substrate of a transmissive LCD such that it prevents from light leakage between two adjacent pixel areas.

Based on the aforementioned idea, the dummy metal is located on a substrate of a reflective LCD such that it planarizes the dielectric layer.

Based on the idea described above, the material of the dummy metal is selected one from the group consisting of Al, Cu and both.

Based on the idea described above, the thickness of the dielectric layer is about 0.6 micron.

Based on the idea described above, the fourth electrical repair layer leaps across a scan line.

Based on the aforementioned idea, the width of the fourth electrical repair layer above the scan line is smaller than that of the other parts of the fourth electrical repair layer.

Based on the idea described above, the material of the first and second electrical repair layers of the dummy metal is selected one from the group consisting of Al, Cu and both.

Based on the aforementioned idea, the material of the third electrical repair layer and the fourth electrical repair layer is selected from the group consisting of Al, Cu and both.

Based on the idea described above, the material of the third electrical repair layer and the fourth electrical repair layer is polysilicon.

Based on the aforementioned idea, the polysilicon is a doped polysilicon for increasing the conductivity.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Some preferred embodiments of the present invention will now be described in greater detail. Nevertheless, it should be recognized that the present invention can be practiced in a wide range of other embodiments besides those explicitly described, and the scope of the present invention is expressly not limited except as specified in the accompanying claims.

Figure 1:
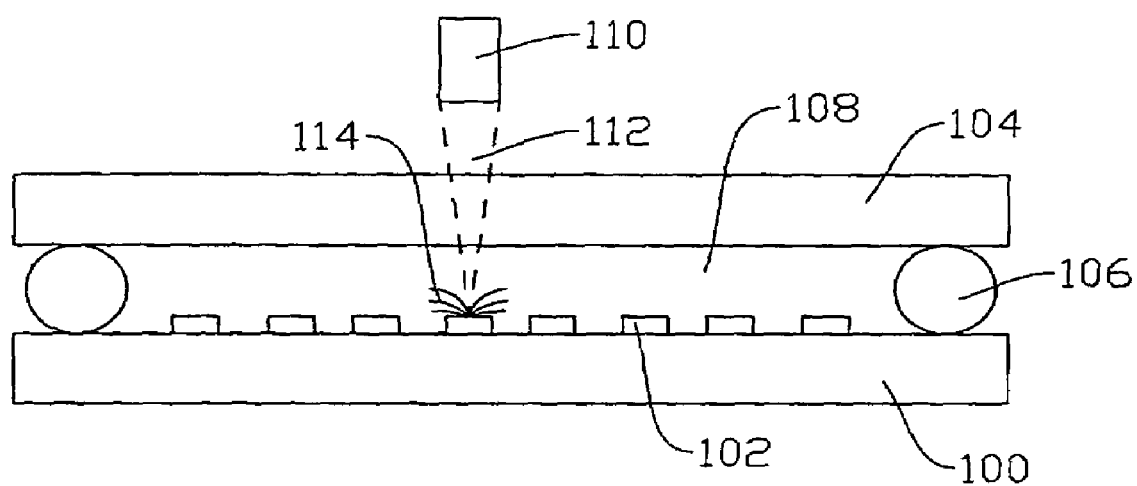
FIG. 1 schematically illustrates a view of conventional laser repair process for darkening a pixel of a liquid crystal display (LCD) device.
Figure 2A:
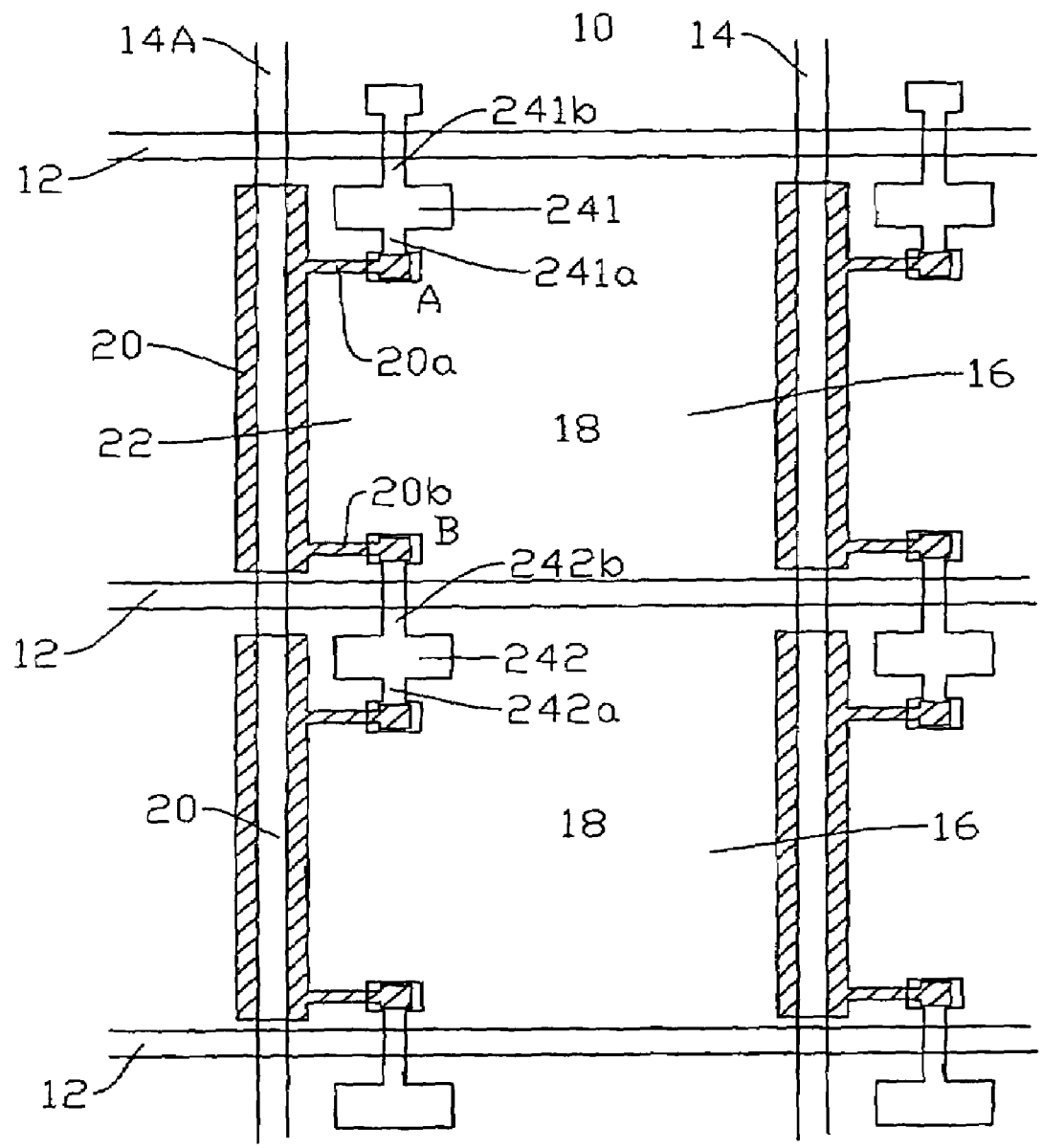
FIGS. 2A and 2B schematically illustrate the top view and the partially enlarging view of a laser repair structure for a transmissive liquid crystal display (LCD) device according to a first embodiment of the present invention.
Figure 2B:
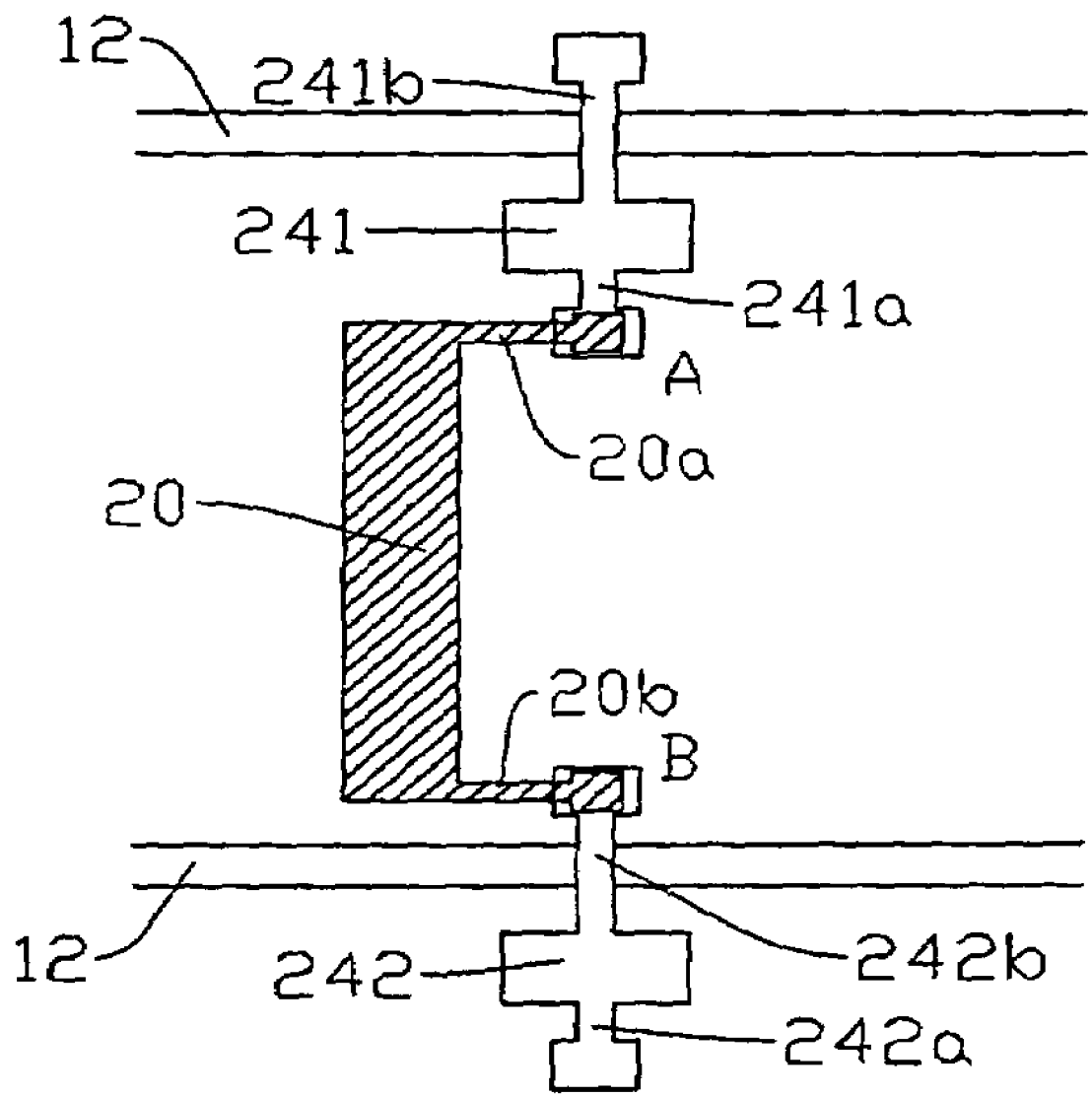

Please refer to FIG. 2A and FIG. 2B, the top view and the partially enlarging view of a laser repair structure for a transmissive LCD device according to a first embodiment of the present invention are shown. A plurality of horizontal scan lines 12, a plurality of vertical data lines 14, and a plurality of pixel areas 16 are formed on a substrate 10 of the transmissive LCD. Each pixel area 16 is defined by two scan lines 12 and two data lines 14. A pixel electrode 18 is put on the surface of the pixel area 16 and a TFT is formed in the pixel area 16 separately. Besides, there is a pattern that floating dummy metal 20 is located between every two pixel areas and below the data lines 14 (the second metal layer) for preventing from light leakage between two pixel areas 16. The dummy metal 20 and the scan lines 12 (the first metal layer) are formed at the same time.

According to the first embodiment of the present invention, there are two extended electrical repair layers 20a-20b attached to the floating dummy metal 20 (the first metal layer), two extended electrical repair layers 241a-241b and two extended electrical repair layers 242a-242b attached to source/drain electrodes 241-242 (the second metal layer) of TFTs respectively. A dielectric layer is put between the extended electrical repair layers 20a (the first metal layer) and the extended electrical repair layers 241a (the second metal layer) at the location A, and it is put between the extended electrical repair layers 20b (the first metal layer) and the extended electrical repair layers 242b (the first metal layer) at the location B, too. Once a defect 22 is found, the laser beams can be used to irradiate the locations A-B in order to connect electrically the source/drain electrode 241 of the TFT and the source/drain electrode 242 of the TFT. Then, the signal of the source/drain electrode 242 of the TFT can be transferred from the extended electric repair layer 242b, through the extended electric repair layer 20b, the dummy metal 20, the extended electric repair layer 20a, and the extended electric repair layer 241a to the source/drain electrode 241 of the TFT. The above pixel electrode 18 can be controlled synchronously by the source/drain electrode 242 of the TFT so as to fix the defect 22.

Figure 3A:
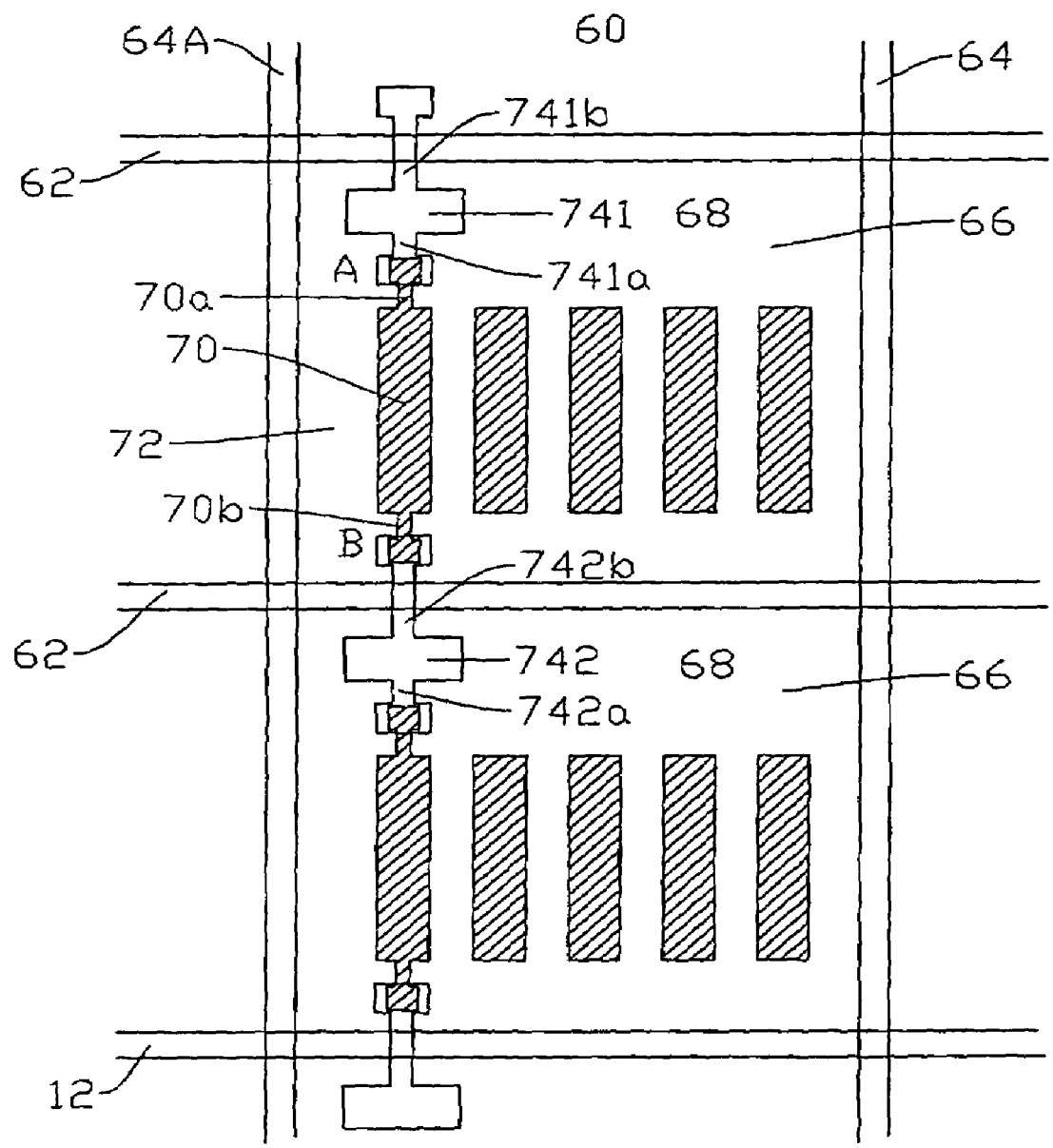
FIGS. 3A and 3B schematically illustrate the top view and the partially enlarging view of a laser repair structure for a reflective liquid crystal display (LCD) device according to a second embodiment of the present invention.
Figure 3B:
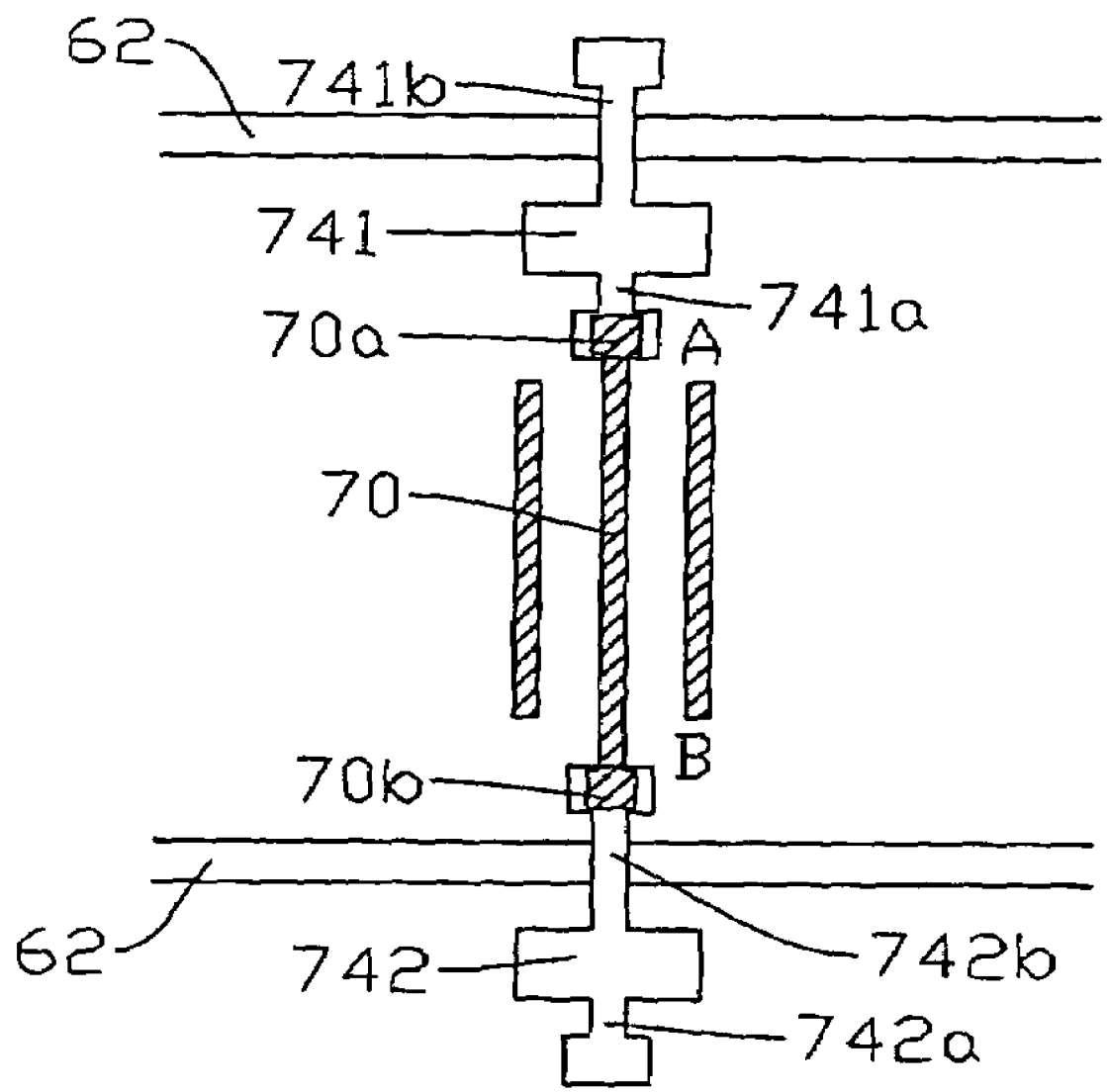

Please refer to FIG. 3A and FIG. 3B, the top view and the partially enlarging view of a laser repair structure for a reflective LCD device according to a second embodiment of the present invention are shown. A plurality of horizontal scan lines 62, a plurality of vertical data lines 64, and a plurality of pixel areas 66 are formed on the substrate 60 of the reflective LCD. Each pixel area 66 is defined by two scan lines 62 and two data lines 64. A pixel electrode 68 is put on the surface of the pixel area 66 and the TFT is formed in the pixel area 66 separately. Besides, there are a floating dummy metal 70 put in the pixel area 66 for planarizing the dielectric layer (not shown in the FIGs.). The dummy metal 70 and the scan lines 62 (the first metal layer) are formed at the same time.

According to the second embodiment of the present invention, there are two extended electrical repair layers 70a-70b attached to at least one of the floating dummy metal 70 (the first metal layer), two extended electrical repair layers 741a-741b and two extended electrical repair layers 742a-742b attached to the source/drain electrodes 741-742 (the second metal layer) of TFTs respectively. The abovementioned dielectric layer is put between the extended electrical repair layers 70a (the first metal layer) and the extended electrical repair layers 741a (the second metal layer) at the location A, and it is put between the extended electrical repair layers 70b (the first metal layer) and the extended electrical repair layers 742b (the first metal layer) at the location B, too. Once a defect 72 is found, the laser beams can be used to irradiate the locations A-B in order to connect electrically the source/drain electrode 741 of the TFT and the source/drain electrode 742 of the TFT. Then, the signal of the source/drain electrode 742 of the TFT can be transferred from the extended electric repair layer 742b, through the extended electric repair layer 70b, the dummy metal 70, the extended electric repair layer 70a, and the extended electric repair layer 741a to the source/drain electrode 741 of the TFT. The above pixel electrode 68 can be controlled synchronously by the source/drain electrode 742 of the TFT so as to fix the defect 72.

The embodiments of this invention are easily executed because one defect can be fixed by using laser beams twice only. Furthermore, a repair yield can reach 90% by using laser welding technology for connecting electrically the first metal layer and the second metal layer, which is separated by the dielectric layer with about 0.6 μm. The repair yield can increase and the energy of the laser beam can be reduced when the thickness of the dielectric layer decreases. In addition, since the extended electric repair layer of the source/drain electrode of the TFT (the second metal layer) leaps across the scan line, the width of the extended electrical repair layer above the scan line is smaller than other parts of the extended electrical repair layer. It will get a lower stray capacitance that can avoid delaying the signals transferred in the metal layers. Such a delay can affect the display quality of LCD. In general, the metal layers and the source/drain electrodes of the TFT, including their extended electrical repair layers, can use same conductive material, such as aluminum (Al), copper (Cu) or both. However, the other non-metal conductive material is also applicable. For example, a doped polycrystalline silicon for increasing conductivity, which usually forms the gate of TFT, or conductive ITO/IZO layer, can be used.

Although the specific embodiment has been illustrated and described, it will be obvious to those skilled in the art that various modifications may be made without departing from what is intended to be limited solely by the appended claims.

What is claimed is:

1. A repair method for manufacturing a display device which comprises:
    a first electrical repair layer extending from a dummy metal to a first repair location;
    a second electrical repair layer extending from said dummy metal to a second laser repair location;
    a third electrical repair layer extending from a source/drain electrode to said first repair location;
    a fourth electrical repair layer extending from a second source/drain electrode to said second repair location, wherein said fourth electrical repair layer leaps across a scan line; and
    a dielectric layer provided between said third electrical repair layer and said first electrical repair layer, and being also provided between said fourth electrical repair layer and said second electrical repair layer; the repair method comprising:
    electrically connecting said first electrical repair layer and said third electrical repair layer; and
    electrically connecting said second electrical repair layer and said fourth electrical repair layer.

2. The repair method according to claim 1, wherein said dummy metal is located on a substrate of a transmissive LCD such that it can prevent from light leakage between two adjacent pixel areas.

3. The repair method according to claim 1, wherein said dummy metal is located on a substrate of a reflective LCD such that it can planarize said dielectric layer.

4. The repair method according to claim 1, wherein the material of said dummy metal is one selected from the group consisting of Al, Cu and both.

5. The repair method according to claim 1, wherein the thickness of said dielectric layer is about 0.6 micron.

6. The repair method according to claim 1, wherein the width of said fourth electrical repair layer above said scan line is smaller than that of the other parts of said fourth electrical repair layer.

7. The repair method according to claim 1, wherein the material of at least one of said first, second, third and fourth electrical repair layers of said dummy metal is one selected from the group consisting of Al, Cu and both.

8. The repair method according to claim 1, wherein the first and third electrical repair layers and the second and fourth electrical repair layers are electrically connected by irradiating a laser beam at the first and second repair locations.

9. A repair method for manufacturing a display device which comprises:
    a first electrical repair layer extending from a dummy metal to a first repair location; a
    second electrical repair layer extending from said dummy metal to a second laser repair location;
    a third electrical repair layer extending from a source/drain electrode to said first repair location;
    a fourth electrical repair layer extending from a second source/drain electrode to said second repair location, wherein the material of said third electrical repair layer and said fourth electrical repair layer is at least one of polysilicon or doped polysilicon; and
    a dielectric layer provided between said third electrical repair layer and said first electrical repair layer, and being also provided between said fourth electrical repair layer and said second electrical repair layer; the repair method comprising:
    electrically connecting said first electrical repair layer and said third electrical repair layer; and
    electrically connecting said second electrical repair layer and said fourth electrical repair layer.

10. A repair structure for a display device, comprising:
    a first electrical repair layer extending from a dummy metal to a first repair location;
    a second electrical repair layer extending from said dummy metal to a second repair location;
    a third electrical repair layer extending from a first source/drain electrode to said first repair location;
    a fourth electrical repair layer extending from a second source/drain electrode to said second repair location wherein said fourth electrical repair layer leaps across a scan line; and
    a dielectric layer provided between said third electrical repair layer and said first electrical repair layer, and being also provided between said fourth electrical repair layer and said second electrical repair layer.

11. The repair structure according to claim 10, wherein said dummy metal is located on a substrate of a transmissive LCD such that it prevents from light leakage between two adjacent pixel areas.

12. The repair structure according to claim 10, wherein said dummy metal is located on a substrate of a reflective LCD such that it planarizes said dielectric layer.

13. The repair structure according to claim 10, wherein the material of said dummy metal is one selected from the group consisting of Al, Cu and both.

14. The repair structure according to claim 10, wherein the thickness of said dielectric layer is about 0.6 micron.

15. The repair structure according to claim 10, wherein the width of said fourth electrical repair layer above said scan line is smaller than that of the other parts of said fourth electrical repair layer.

16. The repair structure according to claim 10, wherein the material of at least one of said first, second, third and fourth electrical repair layers of said dummy metal is one selected from the group consisting of Al, Cu and both.

17. A repair structure for a display device, comprising:
a first electrical repair layer extending from a dummy metal to a first repair location;
a second electrical repair layer extending from said dummy metal to a second laser repair location;
a third electrical repair layer extending from a source/drain electrode to said first repair location;
a fourth electrical repair layer extending from a second source/drain electrode to said second repair location, wherein the material of said third electrical repair layer and said fourth electrical repair layer is at least one of polysilicon or doped polysilicon.

18. A repair structure for a display device, comprising:
a first repair location, associated with a first source/drain electrode of a first TFT, comprising first and second electrical repair layers separated by a first insulating layer, wherein the second electrical repair layer is connected to the first source/drain electrode;
a second repair location, associated with a second source/drain electrode of a second TFT, comprising third and fourth electrical repair layers separated by a second insulating layer, wherein the fourth electrical repair layer is connected to the second source/drain electrode;
a conductor interconnecting the first and third electrical repair layers,
wherein the first source/drain electrode and the second source drain electrode are electrically isolated from each other by insulation of the first and second insulating layers, and wherein the second source/drain electrode synchronously controls the first source/drain electrode upon electrical connection of the first and second electrical repair layers and third and fourth electrical repair layers, respectively.

19. A display device, comprising:
an array of pixels defined by a plurality of scan lines and data lines; and
a repair structure as in claim 10.

20. The display device as in claim 19, wherein the display device is a LCD device.

21. A repair method for manufacturing a display device as in claim 19, comprising:
electrically connecting the first and second electrical repair layers; and
electrically connecting the third and fourth electrical repair layers.

* * * * *